(12) United States Patent
Hiraiwa et al.

(10) Patent No.: US 10,112,569 B2
(45) Date of Patent: Oct. 30, 2018

(54) VEHICLE SEAT WITH SIDE AIRBAG APPARATUS

(71) Applicant: TOYODA GOSEI CO., LTD., Kiyosu-shi, Aichi-ken (JP)

(72) Inventors: Takuya Hiraiwa, Kiyosu (JP); Yuji Sato, Kiyosu (JP); Minoru Ono, Kiyosu (JP); Takashi Iida, Kiyosu (JP); Masashi Hotta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 50 days.

(21) Appl. No.: 15/375,268

(22) Filed: Dec. 12, 2016

(65) Prior Publication Data

US 2017/0182963 A1 Jun. 29, 2017

(30) Foreign Application Priority Data

Dec. 28, 2015 (JP) .................................. 2015-255898

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC ............ B60R 21/207; B60R 21/23138; B60R 21/233; B60R 21/2338; B60R 2021/0006;
(Continued)

(56) References Cited

U.S. PATENT DOCUMENTS 7,681,907 B2 * 3/2010 Svenbrant ............. B60R 21/207
280/728.2
8,459,690 B2 * 6/2013 Breuninger ........... B60R 21/207
280/730.2
(Continued)

FOREIGN PATENT DOCUMENTS

| JP | 2009-023490 A | 2/2009 |
| JP | 2009-023494 A | 2/2009 |

(Continued)

*Primary Examiner* — Laura Freedman
(74) *Attorney, Agent, or Firm* — Posz Law Group, PLC

(57) ABSTRACT

A vehicle seat with a side airbag apparatus includes a seat back having a seat frame, a side airbag apparatus having an airbag and an inflator, and an entry preventing portion. The seat frame includes a pressure receiving plate and an outer frame portion, which surrounds the pressure receiving plate. The airbag and the inflator are installed in the outer side section of the seat back. The airbag includes a main inflation portion and an auxiliary inflation portion. The auxiliary inflation portion is inflated on the front side of the pressure receiving plate prior to inflation of the main inflation portion, thereby pushing the occupant toward the inner side. The entry preventing portion prevents the auxiliary inflation portion being inflated from entering the gap between the outer frame portion and the pressure receiving plate.

9 Claims, 11 Drawing Sheets

(51) Int. Cl.
*B60R 21/2338* (2011.01)
*B60R 21/231* (2011.01)
*B60R 21/00* (2006.01)

(52) U.S. Cl.
CPC .................. *B60R 21/23138* (2013.01); *B60R 2021/0006* (2013.01); *B60R 2021/23107* (2013.01); *B60R 2021/23146* (2013.01); *B60R 2021/23386* (2013.01)

(58) Field of Classification Search
CPC ........... B60R 2021/23146; B60R 2021/23107; B60R 2021/23386
See application file for complete search history.

(56) References Cited

U.S. PATENT DOCUMENTS

| | | | | |
|---|---|---|---|---|
| 8,590,925 B2* | 11/2013 | Kwon | .................. | B60R 21/207 280/730.2 |
| 8,596,675 B2* | 12/2013 | Kwon | .................. | B60R 21/233 280/729 |
| 8,632,126 B2* | 1/2014 | Nitsuma | ............... | B60N 2/4228 297/216.13 |
| 8,702,123 B2* | 4/2014 | Mazanek | ............... | B60R 21/207 280/729 |
| 9,434,341 B2* | 9/2016 | Kaneko | .................. | B60R 21/207 |
| 9,862,345 B2* | 1/2018 | Ohno | .................... | B60R 21/207 |
| 2009/0020988 A1 | 1/2009 | Sato et al. | | |
| 2010/0090448 A1* | 4/2010 | Pursche | .............. | B60R 21/0134 280/730.2 |
| 2012/0123645 A1* | 5/2012 | Kwon | .................. | B60N 2/4235 701/46 |
| 2017/0174174 A1* | 6/2017 | Ohno | .................... | B60R 21/239 |
| 2017/0182962 A1* | 6/2017 | Hiraiwa | ................ | B60R 21/207 |
| 2017/0369020 A1* | 12/2017 | Hiraiwa | ................ | B60N 2/427 |
| 2018/0022308 A1* | 1/2018 | Kunisada | .......... | B60R 21/23138 |
| 2018/0022309 A1* | 1/2018 | Kunisada | .......... | B60R 21/23138 |
| 2018/0050651 A1* | 2/2018 | Fukawatase | .......... | B60R 21/207 |

FOREIGN PATENT DOCUMENTS

| | | |
|---|---|---|
| JP | 2010-076641 A | 4/2010 |
| JP | 2011-105126 A | 6/2011 |
| JP | 2014-080169 A | 5/2014 |

* cited by examiner

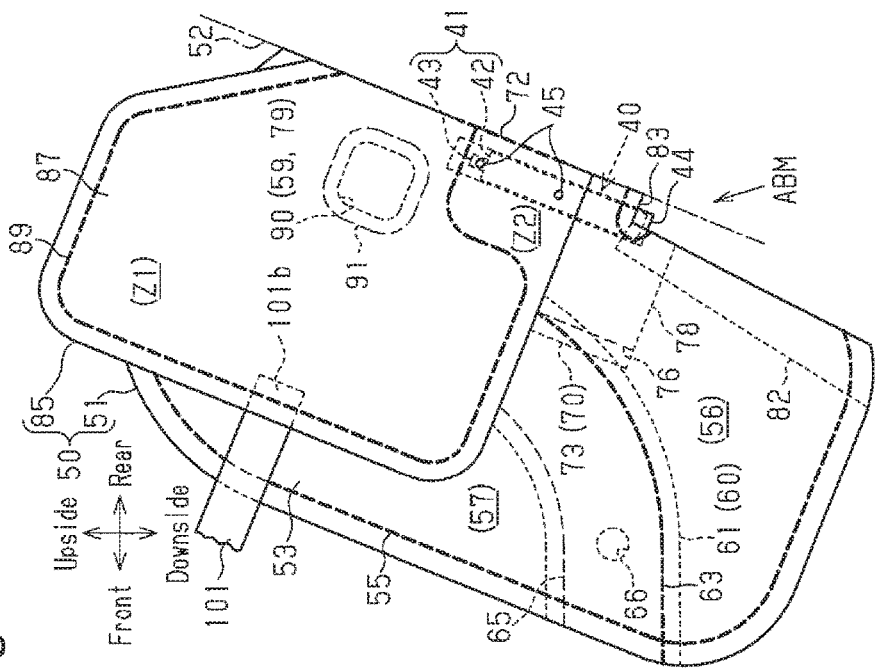
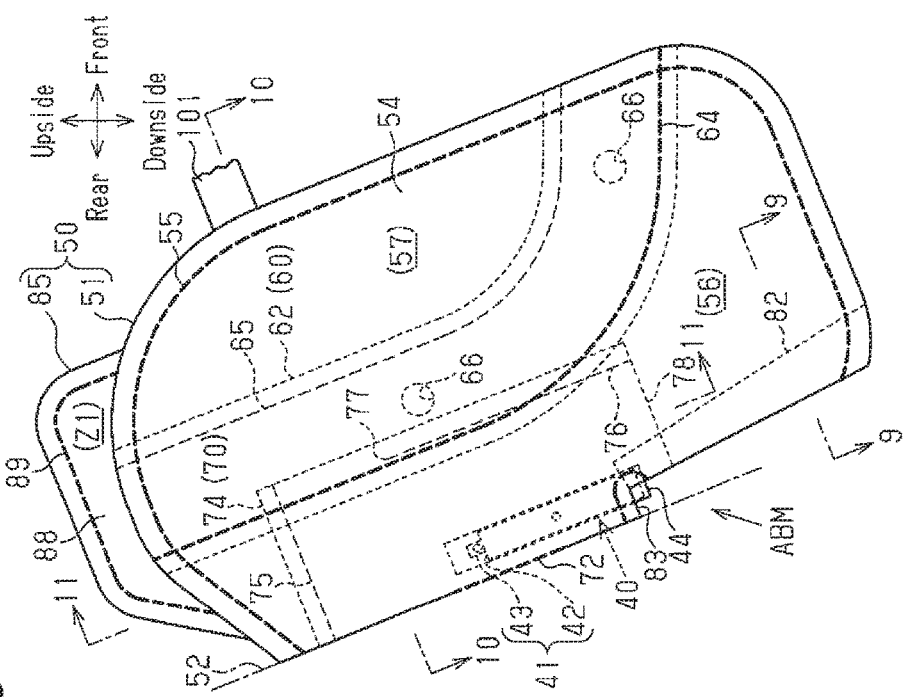

VEHICLE SEAT WITH SIDE AIRBAG APPARATUS

BACKGROUND OF THE INVENTION

The present invention relates to a vehicle seat with a side airbag apparatus.

The side airbag apparatus is widely known as an apparatus that protects an occupant seated in a vehicle seat when an impact is applied to the seat from a side, for example, due to a side collision. A typical side airbag apparatus includes an inflator and an airbag, which is inflated with inflation gas supplied from the inflator. The inflator and the airbag are installed in the outer side of the seat back (backrest) of a vehicle seat.

One known form of the side airbag apparatus includes an airbag having a main inflation portion (a main airbag) and an auxiliary inflation portion (an auxiliary airbag) as disclosed in, for example, Japanese Laid-Open Patent Publications No. 2009-23490 and No. 2009-23494. The names of members inside the parentheses represent the names of members used in Japanese Laid-Open Patent Publications No. 2009-23490 and No. 2009-23494.

The main inflation portion is inflated with inflation gas supplied from the inflator and projects from the seat back to be deployed forward between the occupant and a side wall of the vehicle. Prior to the deployment of the main inflation portion outside the seat back, the auxiliary inflation portion is inflated inside the seat back with inflation gas to push the occupant toward the inner side. The inflated auxiliary inflation portion pushes part of the seat back that is forward of the auxiliary inflation portion so that the part bulges toward the inner side and diagonally forward. The bulging part pushes the back of the occupant leaning against the seat back, thereby moving the occupant toward the inner side. This enlarges the space between the occupant and the side wall, thereby facilitating forward deployment and inflation of the main inflation portion.

If, for example, installed in the vehicle seat disclosed in Japanese Laid-Open Patent Publication No. 2011-105126, the above described airbag apparatus has the following drawbacks.

The vehicle seat disclosed in Japanese Laid-Open Patent Publication No. 2011-105126 includes a seat frame, which constitutes the framework of the seat back. The seat frame includes a pressure receiving plate (a plastic plate), which is arranged at the center in the vehicle width direction, and an outer frame portion, which is separated from and surrounds the pressure receiving plate. The pressure receiving plate is used to stably support the back of the occupant seated in the vehicle seat. The names of members inside the parentheses represent the names of members used in Japanese Laid-Open Patent Publications No. 2011-105126.

If the above described airbag apparatus is employed in the vehicle seat of the publication, the airbag and the inflator, which form the main part of the side airbag apparatus, are installed in the outer side section of the seat back. When the inflator discharges inflation gas, the main inflation portion and the auxiliary inflation portion are respectively inflated. The inflation of the auxiliary inflation portion takes place on the front side of the pressure receiving plate in the seat back. At this time, the auxiliary inflation portion is pushed from the front by the occupant and inflated rearward and may enter the gap between the outer frame portion and the pressure receiving plate in the seat frame. This reduces the reaction force of the auxiliary inflation portion that acts to push the part of the seat back that is forward of the auxiliary inflation portion and causes the part to bulge toward the inner side and diagonally forward. As a result, the movement of the occupant toward the inner side and the enlargement of the space between the occupant and the side wall may be insufficient.

SUMMARY OF THE INVENTION

Accordingly, it is an objective of the present invention to provide a vehicle seat with a side airbag apparatus that includes a seat frame with a pressure receiving plate and is capable of adequately inflating an auxiliary inflation portion to move an occupant toward the inner side in a favorable manner.

To achieve the foregoing objective and in accordance with one aspect of the present invention, a vehicle seat with a side airbag apparatus is provided that includes a seat frame, a side airbag apparatus, and an entry preventing portion. The seat frame forms a framework of a seat back and includes a pressure receiving plate arranged at a center in a vehicle width direction and an outer frame portion, which is separated from and surrounds the pressure receiving plate. The side airbag apparatus includes an airbag and an inflator. The airbag and the inflator are installed in an outer side section of the seat back. The airbag includes a main inflation portion and an auxiliary inflation portion. The main inflation portion is configured to be inflated with inflation gas supplied from the inflator and project from the seat back to be deployed forward between a side wall of the vehicle and an occupant leaning against the seat back in a normal posture. The auxiliary inflation portion is configured to, prior to deployment of the main inflation portion outside the seat back, be inflated on a front side of the pressure receiving plate in the seat back with inflation gas from the inflator, thereby pushing the occupant toward an inner side. The entry preventing portion prevents the auxiliary inflation portion being inflated from entering a gap between the outer frame portion and the pressure receiving plate.

BRIEF DESCRIPTION OF THE DRAWINGS

FIG. 4 is a side view illustrating the airbag module according to the first embodiment, as viewed from the outer side of the vehicle, with the airbag in an uninflated-spread state.

FIG. 5 is a side view illustrating the airbag module according to the first embodiment, as viewed from the inner side of the vehicle, with the airbag in an uninflated-spread state.

DETAILED DESCRIPTION OF THE PREFERRED EMBODIMENTS

First Embodiment

A vehicle seat with a side airbag apparatus according to a first embodiment will now be described with reference to FIGS. 1 to 13B.

In the following description, the direction in which the vehicle advances forward will be referred to as the front, and the reverse direction will be referred to as the rear. The center of the width direction of the vehicle (the vehicle width direction) is used as a reference. A side closer to the center in the vehicle width direction will be referred to as "inner side" of the vehicle, while a side farther from the center in the vehicle width direction will be referred to "outer side" of the vehicle. It is now assumed that an occupant having a size equivalent to a crash test dummy is seated in a normal posture in the vehicle seat. The crash test dummy is, for example, the AM50 (the model that covers 50% of the American adult male population) of the WorldSID program.

Figure 1:
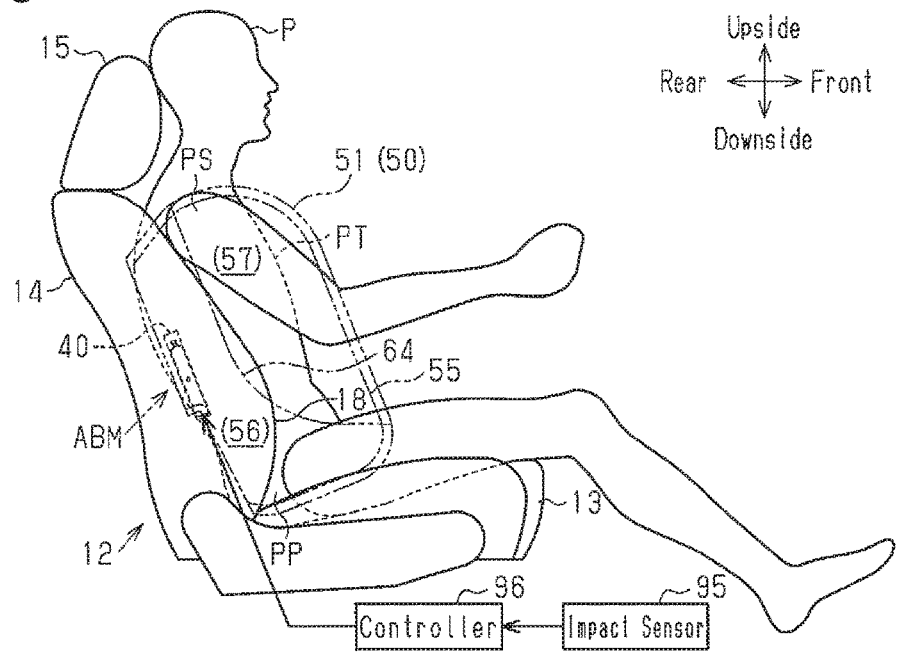
FIG. 1 is a side view illustrating, together with an occupant, a vehicle seat equipped with a side airbag apparatus according to a first embodiment.
Figure 2:
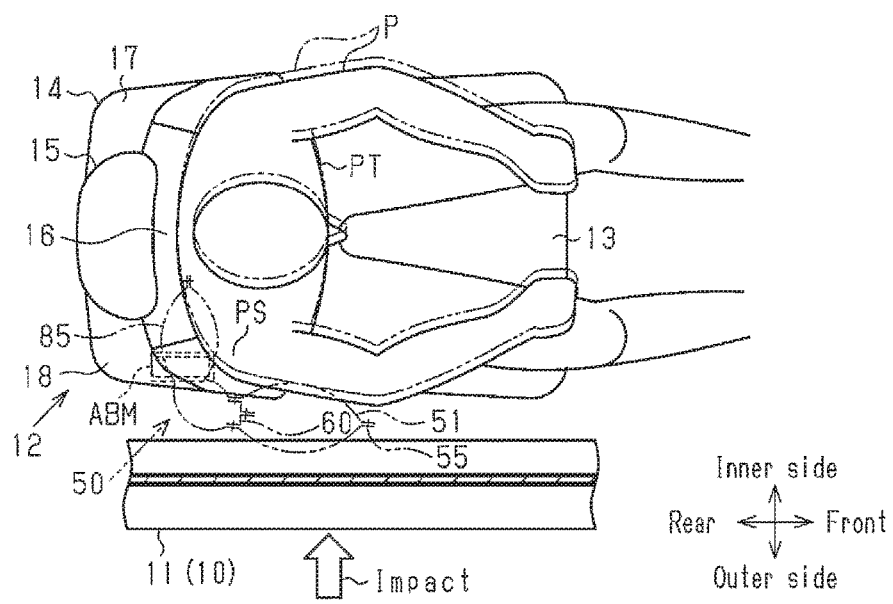
FIG. 2 is a cross-sectional plan view of the positional relationship of the vehicle seat, the airbag, the occupant, and a side wall according to the first embodiment.

As shown in FIGS. 1 and 2, a vehicle seat 12 is arranged on the inner side of a side wall 11 of a vehicle 10. The side wall 11 refers to a vehicle component that is located on a side of the vehicle 10, and mainly corresponds to a door and a pillar. For example, a part of the side wall 11 that corresponds to a front seat includes a front door and a center pillar (B-pillar). A part of the side wall 11 that corresponds to the rear seat includes a rear part of a side door (a rear door), a C-pillar, a front part of a wheel well, and a rear quarter.

The vehicle seat 12 includes a seat cushion 13, a seat back 14, which extends upward from the rear end of the seat cushion 13, and a headrest 15 attached to the top of the seat back 14. The tilt angle of the seat back 14 is adjustable. The vehicle seat 12 is arranged in the passenger compartment such that the seat back 14 faces forward. The width direction of the thus arranged vehicle seat 12 agrees with the direction of the vehicle width.

To distinguish sections in the vehicle width direction of the seat back 14, a middle part in the vehicle width direction will be referred to as a middle section 16, and parts on the sides in the vehicle width direction will be referred to as side sections 17, 18.

Figure 3:
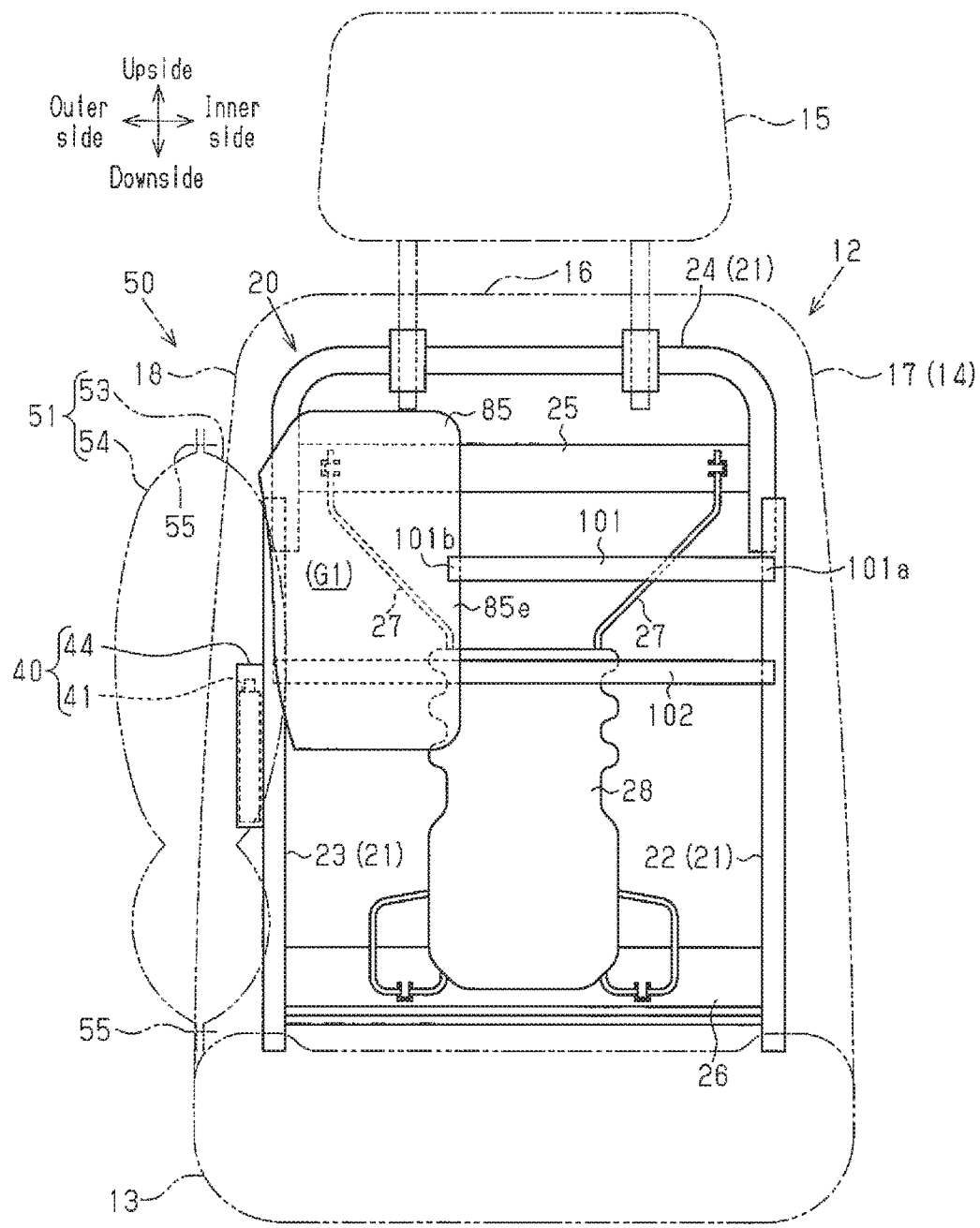
FIG. 3 is a front view of the seat frame according to the first embodiment as viewed from the front side of the vehicle.
Figure 12:
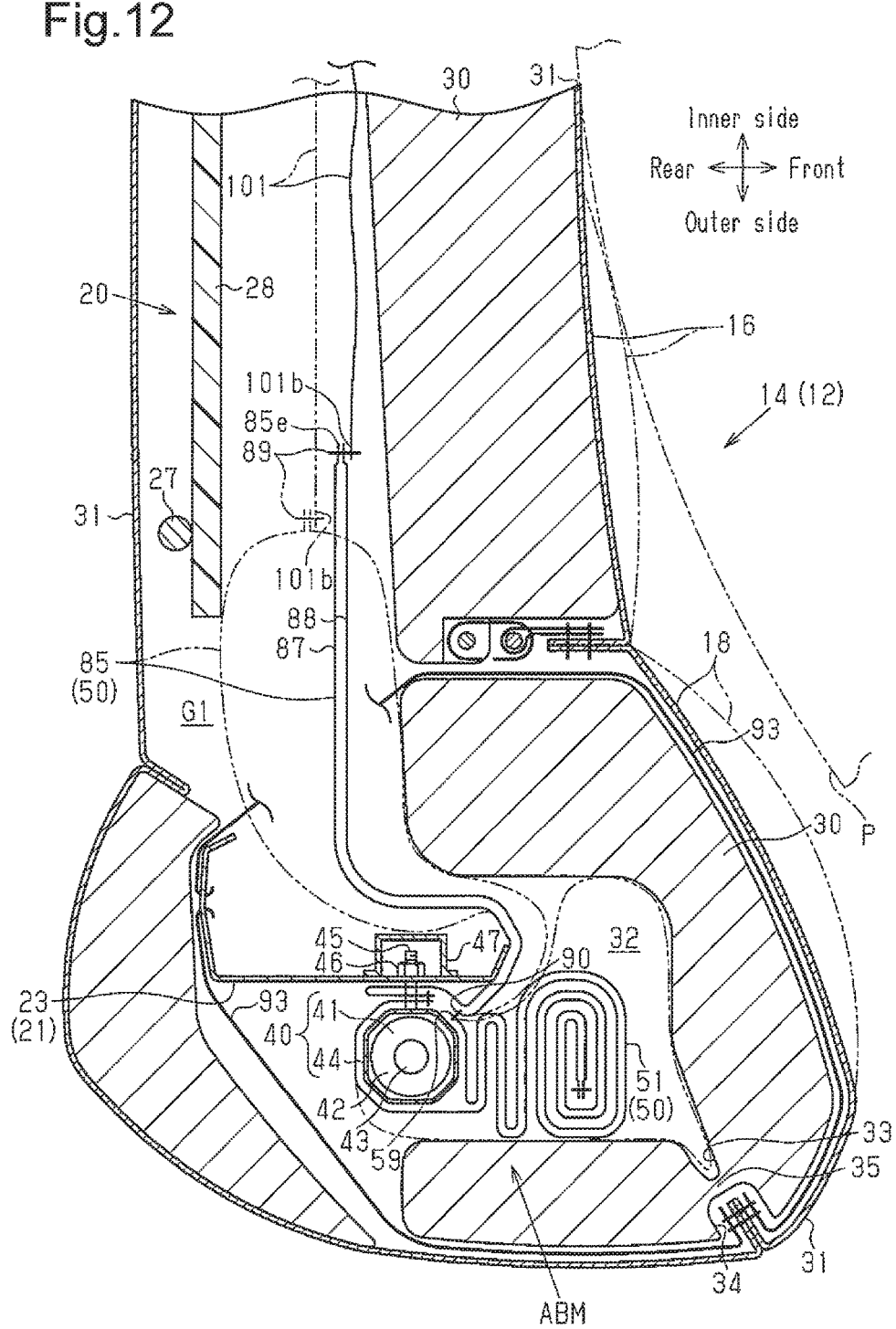
FIG. 12 is a cross-sectional plan view partially showing the internal structure of the seat back according to the first embodiment.

As shown in FIGS. 3 and 12, the framework of the seat back 14 is constituted by a seat frame 20. The periphery of the seat frame 20 is constituted by an outer frame portion 21. The outer frame portion 21 includes a pair of first and second side frame portions 22, 23 and an upper frame portion 24. The first and second side frame portions 22, 23 are formed by bending metal plates into shapes extending vertically. The first side frame portion 22 is arranged in the inner side section 17, and the second side frame portion 23 is arranged in the outer side section 18. The upper frame portion 24 is formed by bending a pipe into an inverted U. The opposite ends of the upper frame portion 24 face each other in the vehicle width direction. The opposite ends of the upper frame portion 24 are respectively fixed to the upper ends of the first and second side frame portions 22, 23. That is, the first and second side frame portions 22, 23 constitute the opposite side sections in the vehicle width direction of the outer frame portion 21. Specifically, the first side frame portion 22 forms the inner side section of the outer frame portion 21, while the second side frame portion 23 forms the outer side section of the outer frame portion 21.

A plate-shaped upper auxiliary frame portion 25, which extends in the vehicle width direction, bridges the opposite ends of the upper frame portion 24. Also, a plate-shaped lower auxiliary frame portion 26, which extends in the vehicle width direction, bridges the lower sections of the first and second side frame portions 22, 23. Rods 27, which are made of spring material, bridge the upper auxiliary frame portion 25 and the lower auxiliary frame portion 26. A pressure receiving plate 28 is attached to the rods 27 from the front side. The pressure receiving plate 28 is configured to support the back of an occupant P seated in the vehicle seat 12 in a stable manner.

As shown in FIG. 12, a seat pad 30 made of an elastic material such as urethane foam is arranged in the vicinity of the seat frame 20. The seat pad 30 is covered with a plurality of covering sheets 31. Adjacent covering sheets 31 are joined to each other through sewing.

A storage portion 32 is provided in part of the outer side section 18 about the second side frame portion 23. An airbag module ABM is installed in the storage portion 32. The airbag module ABM forms a main part of the side airbag apparatus.

A slit 33 extends from a front outer corner of the storage portion 32. Also, a groove 34 is provided in the front part of the side section 18. That is, the part between the slit 33 and the groove 34 serves as a thin breakable portion 35, which is broken by an airbag 50, which will be discussed below.

The airbag module ABM includes as its main components a gas generator 40 and the airbag 50. Each of these components will now be described.

<Gas Generator 40>

Figure 8:
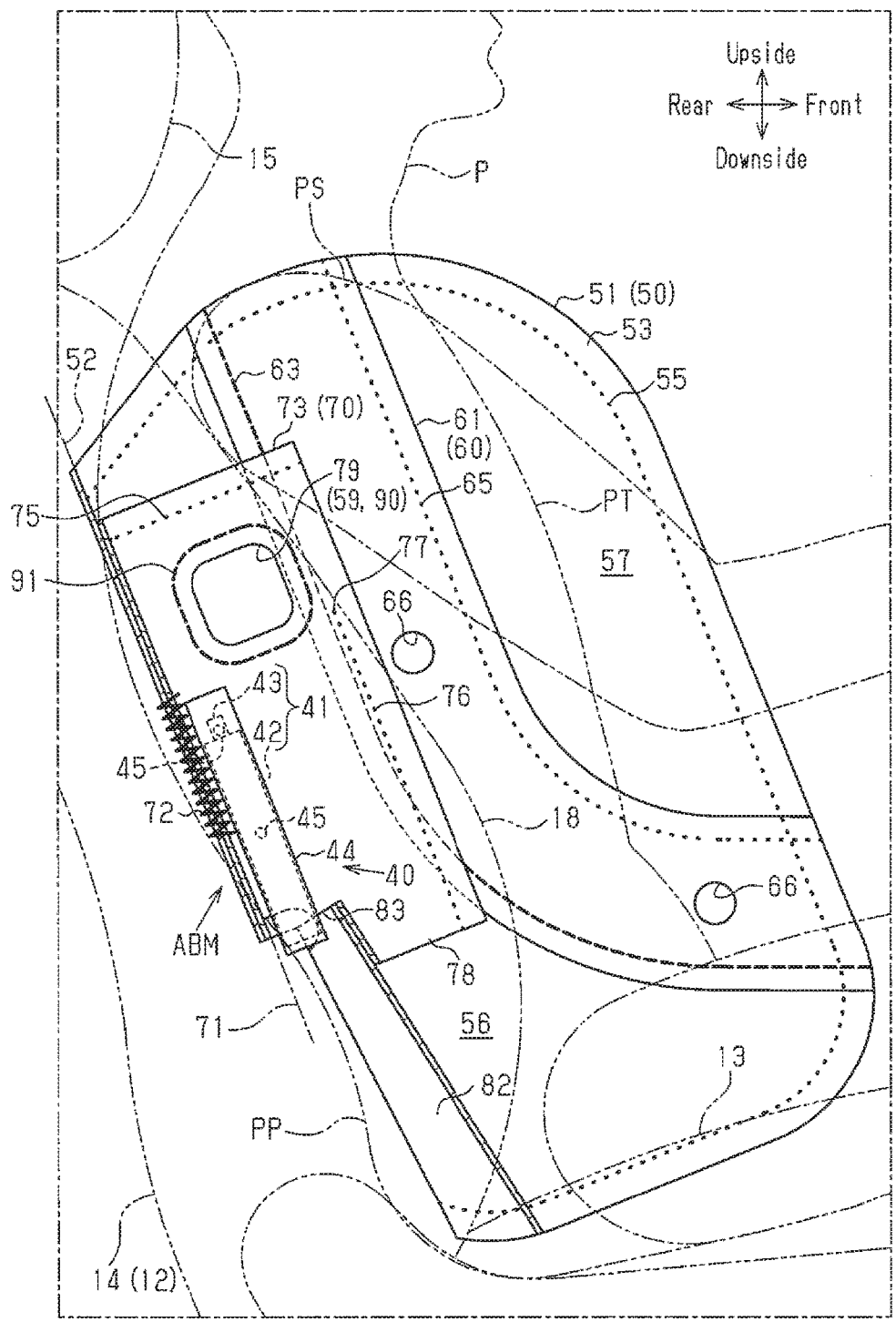
FIG. 8 is a cross-sectional side view illustrating, together with an occupant and a vehicle seat, the internal structure of the main inflation portion of the airbag module shown in FIG. 4.
Figure 9:
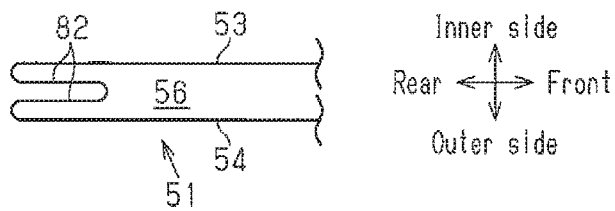
FIG. 9 is a cross-sectional view taken along line 9-9 in FIG. 4.

As shown in FIGS. 8 and 12, the gas generator 40 includes an inflator 41 and a retainer 44, which surrounds the inflator 41. In the present embodiment, a pyrotechnic type inflator is employed as the inflator 41. The inflator 41 includes an elongated main body 42 and a gas outlet 43 provided at one end of the main body 42. The gas outlet 43 has a columnar shape with a diameter smaller than that of the main body 42. The main body 42 stores a gas generating agent (not shown), which generates inflation gas. A harness (not shown) for delivering activation signals to the inflator 41 is connected to the other end of the main body 42. The gas outlet 43 discharges inflation gas generated in the main body 42 in the radially outward direction.

In place of the pyrotechnic type inflator 41 using a gas generating agent, it is possible to use a hybrid type inflator, which discharges inflation gas by breaking a partition of a high-pressure gas cylinder filled with high-pressure gas with low explosive.

The retainer 44 functions as a diffuser for controlling directions of discharged inflation gas and also serves to fasten the inflator 41, together with the airbag 50, to the second side frame portion 23. Most of the retainer 44 is formed by bending a plate such as a metal plate into a substantially cylindrical shape. The retainer 44 has a window (not shown) at a position facing the gas outlet 43. Some of the inflation gas discharged from the gas outlet 43 is supplied to the outside of the retainer 44 through the window.

A pair of bolts 45 is fixed to the retainer 44. The bolts 45 serve as securing members for attaching the retainer 44 to the second side frame portion 23. The gas generator 40 may be formed by integrating the inflator 41 and the retainer 44.

As shown in FIGS. 2 and 3, the main part of the airbag 50 is constituted by a main inflation portion 51 and an auxiliary inflation portion 85, which has a smaller volume than that of the main inflation portion 51. The main inflation portion 51 is inflated with inflation gas to project from the seat back 14 and is deployed forward between the side wall 11 and the occupant P in the normal posture, who is leaning against the seat back 14. In contrast, the auxiliary inflation portion 85 is completely inflated prior to the inflation of the main inflation portion 51. Specifically, prior to the deployment of the main inflation portion 51 outside the seat back 14, the auxiliary inflation portion 85 is inflated with inflation gas at a position forward of the pressure receiving plate 28 of the seat back 14 to push the upper body of the occupant P toward the inner side.

Figure 6:
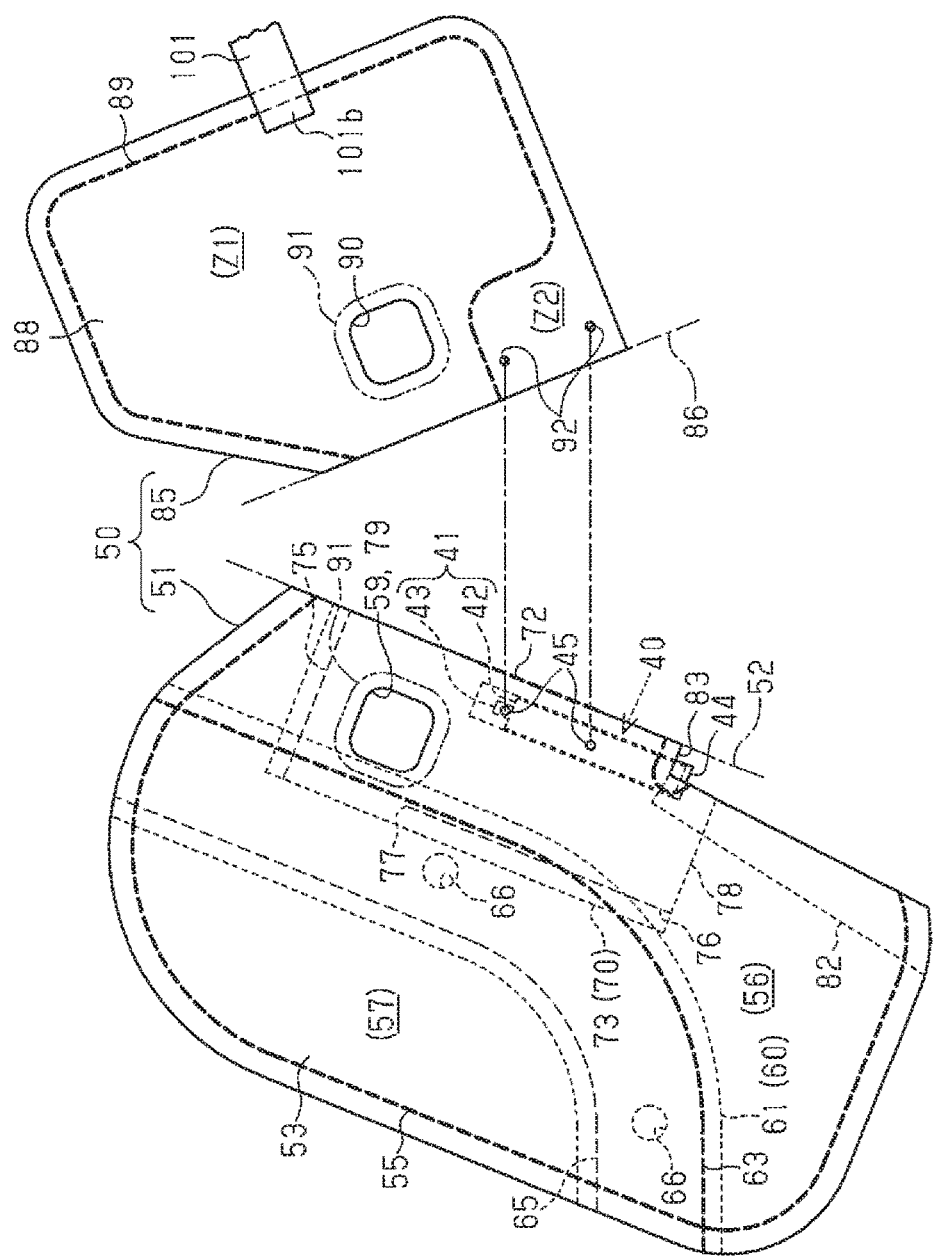
FIG. 6 is a side view illustrating the main inflation portion and the auxiliary inflation portion according to the first embodiment in a separated state.
Figure 7:
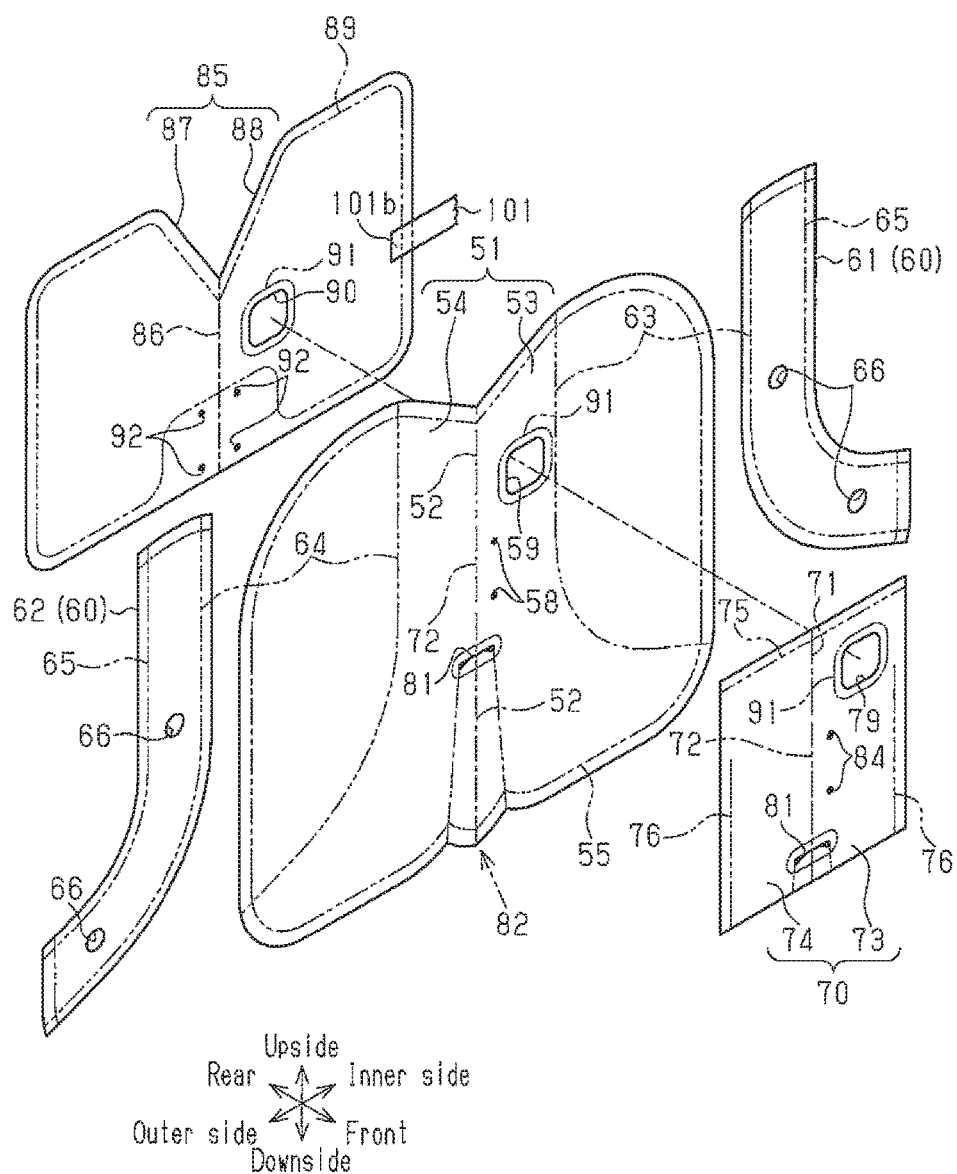
FIG. 7 is an exploded perspective view showing a spread state of the components of the airbag according to the first embodiment.

FIGS. 4 to 6 show the main inflation portion 51 and the auxiliary inflation portion 85 in an uninflated-spread state, in which the inflation portions 51, 85 are flatly spread without being filled with inflation gas. FIG. 7 illustrates a spread state of the components of the airbag 50.

<Main Inflation Portion 51>

FIG. 8 illustrates, together with the vehicle seat 12 and the occupant P, the main inflation portion 51 divided at the center in the vehicle width direction. The auxiliary inflation portion 85 is not illustrated in FIG. 8.

As shown in FIGS. 4 and 6 to 8, the main inflation portion 51 is formed by folding a single fabric piece along a folding line 52 to be superposed in the vehicle width direction, and joining the superposed parts. Such a fabric piece is also referred to as a base fabric or a fabric panel. To distinguish the two superposed parts of the main inflation portion 51, the part located on the inner side will be referred to as a fabric portion 53, and the part located on the outer side will be referred to as a fabric portion 54.

The shape and the size of the fabric portions 53, 54 are determined such that the main inflation portion 51 occupies the region beside most of the upper body of the occupant P (the part including the lumbar region PP and the shoulder region PS) when the main inflation portion 51 is deployed and inflated between the vehicle seat 12 and the side wall 11 (see FIG. 1).

In the first embodiment, the fabric piece is folded in half such that the folding line 52 is located at the rear end of the main inflation portion 51. However, the fabric piece may be folded in half such that the folding line 52 is located at another end such as the front end, the upper end, or the lower end of the main inflation portion 51. The main inflation portion 51 may also be formed of two fabric pieces divided along the folding line 52. Furthermore, the main inflation portion 51 may be formed of three or more fabric pieces.

The fabric portions 53, 54 are preferably formed of a material having high strength and flexibility to be easily folded. The material may be, for example, woven cloth formed of polyester threads or polyamide threads.

The fabric portions 53, 54 are joined to each other at a peripheral joint portion 55 provided along the peripheries. In the first embodiment, the peripheral joint portion 55 is formed by sewing parts of the peripheral portions of the fabric portions 53, 54 except for the rear end, more specifically, the part in the vicinity of the folding line 52. Sewing is also performed on other joint portions, which will be discussed below. The joint portions include rear vertical joint portions 63, 64, a front vertical joint portion 65, a vertical joint portion 72, an upper lateral joint portion 75, a front vertical joint portion 76, a peripheral joint portion 89, and a loop-shaped joint portion 91.

Three different types of broken lines represent sewing portions in FIGS. 4 to 6 and 8. The first broken line includes thick line segments of a certain length arranged intermittently and represents sewing threads as viewed from the side (refer to the peripheral joint portion 55 in FIG. 4). The second broken line includes thin line segments of a certain length (longer than that of a typical broken line) arranged intermittently and represents the state of sewing threads that are located, for example, behind a fabric piece and cannot be seen directly (refer to the front vertical joint portion 65 in FIG. 4). The third broken line includes dots arranged at predetermined intervals and represents the cross-section of the sewing threads extending along the cross-section that passes through the sewn portions (refer to the peripheral joint portion 55 in FIG. 8).

The peripheral joint portion 55 may be formed by a method other than sewing using the sewing threads, but may be formed by, for example, using an adhesive. Such modification is applicable to any of the above described joint portions.

A partition 60 and an inner tube 70 are provided in the main inflation portion 51. Of the partition 60 and the inner tube 70, the partition 60 has the same structure as a member generally referred to as a tether.

<Partition 60>

As shown in FIGS. 4 and 6 to 8, the partition 60 divides the main inflation portion 51 into two front and rear chambers, that is, a rear inflation chamber 56 and a front inflation chamber 57. The partition 60 is formed by a pair of fabric portions 61, 62, which is made of the same material as that of the main inflation portion 51. The lower parts of the fabric portions 61, 62 are inclined rearward. When the main inflation portion 51 is in an uninflated-spread state, the fabric portions 61, 62 are superposed on each other in the vehicle width direction. The upper ends of the fabric portions 61, 62 are joined to the upper ends of the fabric portions 53, 54 of the main inflation portion 51 by part of the peripheral joint portion 55. The front lower ends of the fabric portions 61, 62 of the partition 60 are joined to the front lower parts of the fabric portions 53, 54 of the main inflation portion 51 by part of the peripheral joint portion 55.

Figure 10:
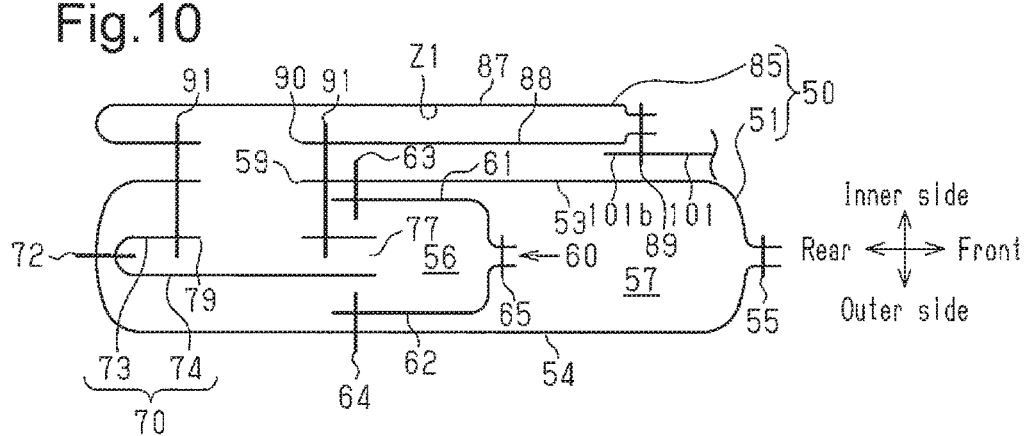
FIG. 10 is a cross-sectional view taken along line 10-10 in FIG. 4.

As shown in FIG. 10, the fabric portion 61 on the inner side has an inner rear vertical joint portion 63 provided along the rear periphery. The fabric portion 61 is joined to the inner fabric portion 53 of the main inflation portion 51 by the rear vertical joint portion 63. The fabric portion 62 on the outer side has a rear vertical joint portion 64 provided along the rear periphery. The outer fabric portion 62 is joined to the fabric portion 54 on the outer side by the rear vertical joint portion 64.

The fabric portions 61, 62 of the partition 60 are joined to each other at a front vertical joint portion 65 at the front peripheries (refer to FIG. 10). The partition 60 bridges the fabric portions 53, 54 of the main inflation portion 51 by the above described joining structure.

Space in the main inflation portion 51 that is rearward of the partition 60 forms the rear inflation chamber 56. The gas generator 40 is located at the rear end of the rear inflation chamber 56. The details will be discussed below. The rear inflation chamber 56 starts being supplied with inflation gas from the inflator 41 at timing earlier than that of the front inflation chamber 57 to be deployed and inflated beside the rear half of the thorax region PT and the lumbar region PP in the upper body of the occupant P.

Space in the main inflation portion 51 that is forward of the partition 60 forms the front inflation chamber 57. The front inflation chamber 57 is supplied with inflation gas via the rear inflation chamber 56 and the partition 60 and is deployed and inflated beside the front half of the thorax region PT and the shoulder region PS in the upper body of the occupant P.

The partition 60 has openings 66, which connect the rear inflation chamber 56 and the front inflation chamber 57 with each other. As shown in FIG. 7, the openings 66 of the first embodiment are formed by holes formed in each of the fabric portions 61, 62 of the partition 60. Since each fabric portion 61, 62 has a pair of holes, the partition 60 has four holes, or four openings 66.

One or more than two openings 66 may be formed in each of the fabric portions 61, 62. Alternatively, only one of the fabric portions 61, 62 may have openings 66.

<Inner Tube 70>

The inner tube 70 is arranged in the rear inflation chamber 56 to encompass most of the gas generator 40 except for the lower end. The part of the gas generator 40 that is encompassed by the inner tube 70 includes the gas outlet 43 of the inflator 41. The inner tube 70 has a function of regulating the flow of inflation gas from the gas outlet 43.

The inner tube 70 is formed by a single rectangular fabric piece made of the same material as the main inflation portion 51. The surface of the fabric piece may be coated with silicone resin.

The fabric piece in a spread state has a vertically extending folding line 71 at the center in the width direction of the fabric piece. The fabric piece is arranged with the folding line 71 matched with the folding line 52 of the main inflation portion 51 in a spread state. The fabric piece is joined to the main inflation portion 51 by the vertical joint portion 72, which is provided along the folding lines 71, 52. This determines the position of the inner tube 70 in relation to the main inflation portion 51.

The fabric piece is folded in half along the folding line 71 to be superposed on itself in the vehicle width direction. To distinguish the two superposed portions of the fabric piece, the part located on the inner side will be referred to as a fabric portion 73, and the part located on the outer side will be referred to as a fabric portion 74.

The fabric portions 73, 74, which are superposed on each other, are joined to each other at the upper lateral joint portion 75 provided at the upper edges. In contrast, the lower edges of the fabric portions 73, 74 superposed on each other are not joined to each other. Further, the fabric portions 73, 74, which are superposed on each other, are joined to each other by the front vertical joint portion 76 provided along the front edges. The front vertical joint portion 76 is not provided in front upper parts of the fabric portions 73, 74, so that the fabric portions 73, 74 are not joined to each other.

The above described joining structure forms the inner tube 70, which has a closed upper end, an open lower end, and an open front upper part and extends substantially vertically as a whole. The front upper open part and the open lower end of the inner tube 70 constitute gas supply ports 77, 78 respectively. The gas supply ports 77, 78 supply, to the rear inflation chamber 56, inflation gas discharged to the inner tube 70 from the gas outlet 43 of the inflator 41.

The main inflation portion 51 and the inner tube 70, which are superposed on each other and each folded in half, each have a slit 81 at the rear end and the middle part in the vertical direction. The slits 81 extend in a direction orthogonal to the folding lines 52, 71 (see FIG. 7). The parts of the fabric portions 53, 54 and the fabric portions 73, 74 that are below the slits 81 constitute an inward folding portion 82, which is folded into, or tucked into the remaining parts of the main inflation portion 51 and the inner tube 70 (see FIG. 9). The lower end of the inward folding portion 82 in the main inflation portion 51 is joined to the remaining parts of the fabric portions 53, 54 by part of the peripheral joint portion 55. When the inward folding portion 82 is formed, the slits 81 are opened to form an insertion port 83 for the gas generator 40. The fabric portions 53, 73 on the inner side respectively have bolt insertion holes 58, 84 above the slits 81 (the insertion port 83) to receive the two bolts 45 of the gas generator 40.

The gas generator 40 is arranged to extend substantially vertically, and most of the gas generator 40 except for the lower end is inserted, through the insertion port 83, into the rear end of the inner tube 70, which is the rear end of the rear inflation chamber 56 in the main inflation portion 51. The lower end of the gas generator 40 is exposed to the outside of the main inflation portion 51. The bolts 45 of the gas generator 40 are inserted into the bolt insertion holes 84, 58, so that the gas generator 40 is secured to and positioned relative to the inner tube 70 and the main inflation portion 51.

<Auxiliary Inflation Portion 85>

As shown in FIGS. 4, 5, and 7, the auxiliary inflation portion 85 is formed by a single fabric piece made of the same material as the main inflation portion 51. The fabric piece has a folding line 86 at the center in the width direction and is folded in half along the folding line 86 to be superposed on itself in the vehicle width direction. The superposed parts are joined to each other to form the auxiliary inflation portion 85. To distinguish the two superposed portions of the auxiliary inflation portion 85, the part located on the outer side and adjacent to the fabric portion 53 of the main inflation portion 51 will be referred to as a fabric portion 88, and the part located on the inner side and not adjacent to the fabric portion 53 of the main inflation portion 51 will be referred to as a fabric portion 87.

The shape and the size of the fabric portions 87, 88 are determined such that, when the auxiliary inflation portion 85 is inflated, the fabric portions 87, 88 are located at the height equivalent to the height of the shoulder region PS of the occupant P and push the shoulder region PS toward the inner side.

In the first embodiment, the fabric piece is folded in half such that the folding line 86 is located at the rear end of the auxiliary inflation portion 85. However, the fabric piece may be folded in half such that the folding line 86 is located at another end of the auxiliary inflation portion 85. The auxiliary inflation portion 85 may also be formed of two fabric pieces divided along the folding line 86. Furthermore, the auxiliary inflation portion 85 may be formed of three or more fabric pieces.

Figure 11:
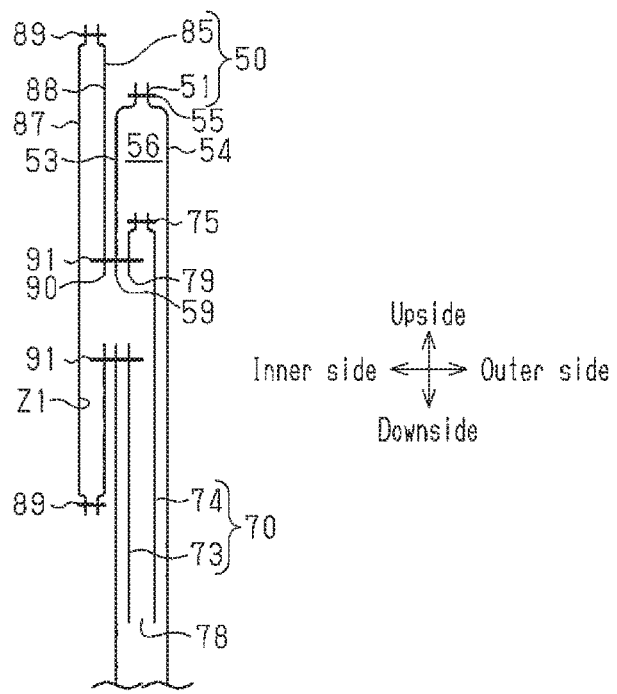
FIG. 11 is a cross-sectional view taken along line 11-11 in FIG. 4.

As shown in FIGS. 10 and 11, the fabric portions 87, 88 of the auxiliary inflation portion 85 are joined to each other at the peripheries except for the rear ends and the like. Specifically, the fabric portions 87, 88 are joined to each other by the peripheral joint portion 89, which is provided on the peripheries of the fabric portions 87, 88 except for the parts in the vicinity of the folding line 86. The "rear ends and the like" includes the rear lower parts of the fabric portions 87, 88, which are superposed on each other. The peripheral joint portion 89 is curved to detour the rear lower parts of the fabric portions 87, 88. The region of the auxiliary inflation portion 85 that is surrounded by the peripheral joint portion 89 constitutes an inflation region Z1, which is inflated by being supplied with inflation gas. The region in the auxiliary inflation portion 85 that is not surrounded by the peripheral joint portion 89, that is, the region about the inflation region Z1, constitutes a non-inflation region Z2, which is neither supplied with inflation gas nor inflated. The non-inflation region Z2 includes the rear lower parts.

In the inflation region Z1 of the auxiliary inflation portion 85, no equivalents of the partition 60 and the inner tube 70, which are arranged in the main inflation portion 51, are provided. Also, the inflator 41 is not arranged in the inflation region Z1 of the auxiliary inflation portion 85.

The auxiliary inflation portion 85 in an uninflated-spread state is arranged such that at least part thereof is superposed on the main inflation portion 51 in an uninflated-spread state. In the first embodiment, the most part of the auxiliary inflation portion 85 except for the upper end is superposed on the upper part of the main inflation portion 51 as shown in FIG. 5.

As shown in FIGS. 5, 6, and 7, the rear inflation chamber 56 of the main inflation portion 51, the inner tube 70, and the inflation region Z1 of the auxiliary inflation portion 85 respectively have communication ports 59, 79, 90 at positions that are in the vicinity of the gas outlet 43 of the inflator 41 and in which the inflation region Z1 is superposed on the main inflation portion 51. As shown in FIGS. 10 and 11, the main inflation portion 51, the inner tube 70, and the auxiliary inflation portion 85 are connected with one another via the communication ports 59, 79, 90. The opening areas of the communication ports 59, 79, 90 are equal to or substantially equal to one another. In other words, the communication ports 59, 79, 90 have a common opening area.

In the first embodiment, the inflator 41 is arranged such that the gas outlet 43 is located at a position where the inflation zone Z1 of the auxiliary inflation portion 85 and the main inflation portion 51 are superposed on each other and between the main body 42 and the communication ports 59, 79, 90, so that the gas outlet 43 is located close to the communication ports 59, 79, 90.

As shown in FIGS. 8 and 10, the main inflation portion 51, the inner tube 70, and the auxiliary inflation portion 85 are joined to one another by only the loop-shaped joint portion 91 about the communication ports 59, 79, 90.

The fabric portions 87, 88 have bolt insertion holes 92 in rear lower parts in the non-inflation region Z2 to receive the two bolts 45 of the gas generator 40. The bolts 45 of the inflator 41, which are passed through the inner tube 70 and the main inflation portion 51, are received by the bolt insertion holes 92 of the fabric portions 87, 88 of the auxiliary inflation portion 85.

As shown in FIG. 12, the airbag module ABM, which includes the gas generator 40 and the airbag 50 as main components, is stored in the storage portion 32 in the outer side section 18 of the seat back 14.

The bolts 45 extend from the gas generator 40 and are passed through the inner tube 70, the main inflation portion 51, and the auxiliary inflation portion 85, and are inserted into the second side frame portion 23 from the outer side. In FIG. 12, the inner tube 70 is not illustrated. Nuts 46 are threaded to the bolts 45 from the inner side to fix the gas generator 40 to the second side frame portion 23 together with the rear inflation chamber 56 of the main inflation portion 51, the inner tube 70, and the non-inflation region Z2 of the auxiliary inflation portion 85.

The gas generator 40 may be fixed to the second side frame portion 23 using members other than the bolts 45 and the nuts 46.

FIG. 12 illustrates a cover 47 that is attached to the second side frame portion 23 from the inner side to cover the bolts 45 and the nuts 46, so that the auxiliary inflation portion 85 will not be damaged by the bolts 45.

As shown in FIG. 12, the main inflation portion 51 in an uninflated-spread state is either roll-folded or accordion-folded to be compact in the front-rear direction and the vertical direction and arranged in the storage portion 32. The roll-folding refers to a folding method in which one end of the main inflation portion 51 is set as a center and the remaining portion is wrapped about the center. The accordion-folding refers to a folding method in which the main inflation portion 51 is repeatedly folded by a constant width while alternating the folding direction.

In contrast, part of the auxiliary inflation portion 85 that is on the inner side of the part that is fixed to the second side frame portion 23 on the outer side is arranged to be forward of the pressure receiving plate 28 in the seat back 14 in a spread state without being folded. More specifically, the auxiliary inflation portion 85 is fixed to the second side frame portion 23 from the outer side. The auxiliary inflation portion 85 is routed to pass in front of the second side frame portion 23 and to extend to the space on the inner side of the second side frame portion 23. The auxiliary inflation portion 85 is then routed to pass between the cover 47 and the seat pad 30 to be arranged between the pressure receiving plate 28 and the seat pad 30. Between the pressure receiving plate 28 and the seat pad 30, the fabric portion 88 of the auxiliary inflation portion 85 is located in front of the fabric portion 87.

Further, as shown in FIG. 12, webbings 93 of a low extensibility material are provided between the covering sheets 31 and the seat pad 30 and wrapped about the second side frame portion 23 on the outer side and the airbag module ABM. The webbings 93 are provided to promote deployment of the main inflation portion 51. That is, the webbings 93 are extended at an early stage of deployment and inflation of the main inflation portion 51, thereby restricting the main inflation portion 51 from being inflated in directions different from a predetermined deployment direction. Also, the webbings 93 restrain deformation of the seat pad 30 and extension of the covering sheets 31, thereby promoting breakage of the seat pad 30 at the breakable portion 35. In this manner, the webbings 93 assist the inflating main inflation portion 51 in breaking the outer side section 18.

The webbings 93 are spaced apart upward or downward from the inflation area of the auxiliary inflation portion 85. With this arrangement, the webbings 93 are unlikely to contact the auxiliary inflation portion 85 and hinder the inflation of the auxiliary inflation portion 85. In other words, the webbings 93 are arranged at positions where the webbings 93 do not contact the auxiliary inflation portion 85 during inflation of the auxiliary inflation portion 85.

As shown in FIG. 1, the side airbag apparatus includes an impact sensor 95 and a controller 96 in addition to the above described airbag module ABM. The impact sensor 95 is formed by an acceleration sensor and the like. The impact sensor 95 is provided on the side wall 11 of the vehicle 10 shown in FIG. 2 or the like to detect an impact applied to the side wall 11 from the side. The controller 96 controls operation of the inflator 41 based on a detection signal from the impact sensor 95.

Furthermore, the vehicle 10 is equipped with a seat belt apparatus for restraining the occupant P seated in the vehicle seat 12. However, illustration of the seat belt apparatus is omitted in FIG. 1.

The basic configuration of the vehicle seat with a side airbag apparatus has been described so far. In addition to the above described basic configuration, the first embodiment includes an entry preventing portion, which prevents the inflating auxiliary inflation portion 85 from entering a gap G1 between the outer frame portion 21 and the pressure receiving plate 28. The entry preventing portion is constituted by a tension belt 101 and a rear belt 102, which are both made of a low extensibility material.

The tension belt 101 extends in the vehicle width direction. A first end 101a of the tension belt 101 is fixed to the first side frame portion 22 on the inner side. A second end 101b of the tension belt 101 is fixed to a position on the auxiliary inflation portion 85 that is on the inner side of the part fixed to the second side frame portion 23, and at which, when the auxiliary inflation portion 85 is completely inflated, the tension belt 101 is tensioned. In the first embodiment, the position that satisfies the condition is set as an end 85e on the inner side of the auxiliary inflation portion 85 in a spread state. The method for fixing the tension belt 101 to the auxiliary inflation portion 85 is not particularly limited and may be sewing with sewing threads or bonding with adhesive.

The rear belt 102 bridges, in a tensioned state, the first and second side frame portions 22, 23 with part located behind the auxiliary inflation portion 85 in a spread state. The rear belt 102 may be arranged in front of or behind the pressure receiving plate 28.

Operation and advantages of the vehicle seat with a side airbag apparatus according to the first embodiment, which is configured as described above, will now be described.

In the first embodiment, the auxiliary inflation portion 85 is maintained in a spread state by the tension belt 101. Thus, the auxiliary inflation portion 85 is unlikely to be installed at a position displaced from the proper position in the seat back 14. When assembling the vehicle seat 12, the seat pad 30 is prevented from being attached to the seat frame 20 with the auxiliary inflation portion 85 displaced from the proper position.

As shown in FIGS. 1 and 2, when the impact sensor 95 detects that an impact of a magnitude greater than or equal to a predetermined value has been applied to the side wall 11 due to a side collision or the like when the vehicle 10 is traveling, the controller 96 outputs, based on the detection signal, an activation signal for activating the inflator 41 to the inflator 41. In response to the activation signal, the inflator 41 discharges inflation gas through the gas outlet 43. The discharged inflation gas is first supplied to the inner tube 70, which surrounds the gas outlet 43, as shown in FIG. 8. The inflation gas starts inflating part of the main inflation portion 51 that is about the inner tube 70.

The flow of the inflation gas supplied to the inner tube 70 is regulated by the inner tube 70. Such regulation of flow causes some of the inflation gas to flow through the gas supply port 77 in the front upper part of the inner tube 70 (see FIG. 10) and the gas supply port 78 at the lower end (see FIG. 11) and to be supplied to the rear inflation chamber 56 of the main inflation portion 51.

The supply of the inflation gas through the two gas supply ports 77, 78 increases the internal pressure of the rear inflation chamber 56, so that the rear inflation chamber 56 starts being inflated. The inflation of the rear inflation chamber 56 pulls the partition 60 toward the opposite sides in the vehicle width direction. The partition 60 in the tensioned state restricts the inflation of the rear inflation chamber 56 in the vehicle width direction (see FIGS. 2 and 3).

Also, some of the inflation gas supplied to the rear inflation chamber 56 flows out to the front inflation chamber 57 through the openings 66 of the partition 60. The inflow of the inflation gas causes the front inflation chamber 57 to start being inflated with a delay from the rear inflation chamber 56.

The rear inflation chamber 56 and the front inflation chamber 57 are inflated while being unfolded in the reverse order of that when these were folded. The main inflation portion 51, which is deployed and inflated in the above described manner, pushes the seat pad 30 of the seat back 14, so that the seat pad 30 is broken at the breakable portion 35 shown in FIG. 12. The main inflation portion 51 is projected forward from the seat back 14 through the broken portion with part of the main inflation portion 51 remaining in the storage portion 32 (see FIGS. 1 and 2).

On the other hand, some of the inflation gas discharged into the inner tube 70 from the gas outlet 43 of the inflator 41 flows into the auxiliary inflation portion 85 from the communication port 79 of the inner tube 70 and through the communication port 59 of the main inflation portion 51 and the communication port 90 of the auxiliary inflation portion 85 in the order (see FIGS. 10 and 11). The part of the inflation gas that has flowed into the auxiliary inflation portion 85 causes the auxiliary inflation portion 85 to start being inflated in the seat back 14 at a position forward of the pressure receiving plate 28 toward the boundary between the middle section 16 and the outer side section 18.

At the inflation of the auxiliary inflation portion 85, the second side frame portion 23, which has a high rigidity, functions as a pressure receiving portion to receive the pressure of the inflation gas diffused in the auxiliary inflation portion 85. This produces reaction force acting toward the vicinity of the boundary of the seat back 14. The reaction force causes the auxiliary inflation portion 85 to be inflated toward the inner side and diagonally forward. The inflated auxiliary inflation portion 85 pushes part of the outer side section 18 close to the middle section 16 so that the part bulges toward the inner side and diagonally forward.

At this time, if the auxiliary inflation portion 85 were inflated rearward and entered the gap G1 between the outer frame portion 21 and the pressure receiving plate 28 in the seat frame 20, the reaction force of the auxiliary inflation portion 85 would be reduced, which reaction force acts to push part of the seat back 14 that is forward of the auxiliary inflation portion 85 and causes the part to bulge toward the inner side and diagonally forward.

Figure 13A:
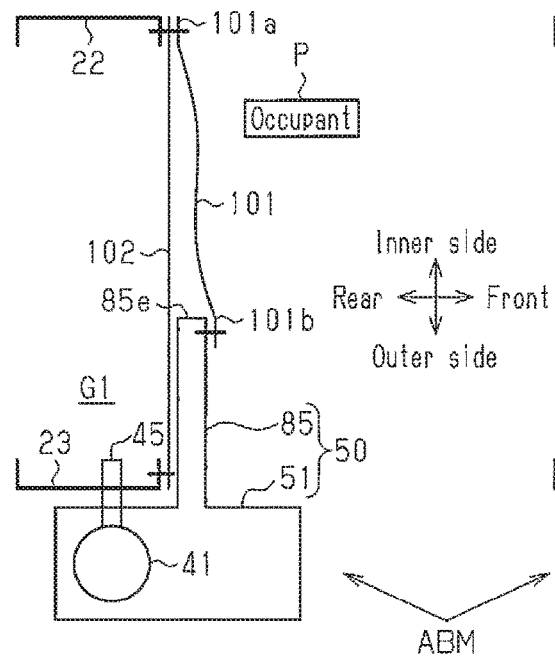
FIG. 13A is an explanatory diagram of operation of the first embodiment, illustrating a state in which the airbag is stored in the vehicle seat.
Figure 13B:
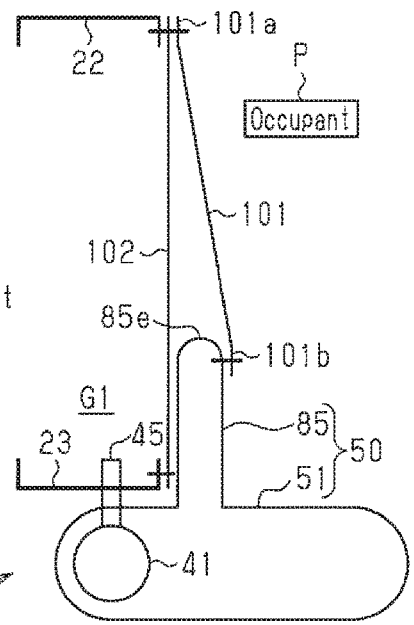
FIG. 13B is an explanatory diagram of operation of the first embodiment, illustrating a state in which the airbag is inflated in the vehicle seat.

However, in the first embodiment, as shown in FIGS. 12, 13A, and 13B, the auxiliary inflation portion 85 is prevented from being inflated rearward and entering the gap G1 of the seat frame 20 by the entry preventing portion. That is, the measurement in the vehicle width direction of the auxiliary inflation portion 85 is maximized when stored, that is, when the auxiliary inflation portion 85 is spread in the vehicle width direction, and the measurement is reduced when the auxiliary inflation portion 85 is supplied with inflation gas and inflated. On the other hand, the end of the auxiliary inflation portion 85 on the outer side is fixed to the second side frame portion 23 on the outer side. Thus, as the auxiliary inflation portion 85 is inflated, the end 85e on the inner side of the auxiliary inflation portion 85 is moved toward the outer side. This pulls the tension belt 101 toward the outer side. When the auxiliary inflation portion 85 is completely inflated as shown in FIG. 13B, the tension belt 101 is tensioned. The tension belt 101 then restricts the movement of the auxiliary inflation portion 85, thereby preventing the auxiliary inflation portion 85 from being inflated rearward and entering the gap G1 of the seat frame 20.

When the auxiliary inflation portion 85 is inflated, part of the rear belt 102, which bridges the first and second side frame portions 22, 23 in a tensioned state, is located behind the inflated auxiliary inflation portion 85 as shown in FIG. 3. The rear belt 102 then restricts rearward movement of the auxiliary inflation portion 85, thereby preventing the auxiliary inflation portion 85 from being inflated rearward and entering the gap G1 of the seat frame 20.

The pressure of the inflation gas in the auxiliary inflation portion 85 is received and reaction force is efficiently generated.

If stored in a folded state, the auxiliary inflation portion 85 would be inflated while being unfolded. Some of the energy of the inflation gas would be spent for unfolding, which would hinder smooth inflation. In contrast, the auxiliary inflation portion 85 of the first embodiment is stored in a spread state and thus does not need to be unfolded. This allows for smooth inflation.

Since the auxiliary inflation portion 85 is inflated, the middle section 16 bulges toward the inner side and diagonally forward to push the back of the occupant P leaning against the seat back 14 toward the inner side and diagonally forward as indicated by the long dashed double-short dashed lines in FIG. 12 before the main inflation portion 51 is deployed forward outside the seat back 14. The occupant P is moved toward the inner side as indicated by the long dashed double-short dashed lines in FIG. 2. The direction of the movement is away from the side wall 11. Further, since the auxiliary inflation portion 85 has a smaller volume than that of the main inflation portion 51, the auxiliary inflation portion 85 is completely inflated at an earlier time than the main inflation portion 51. Thus, prior to deployment of the main inflation portion 51 outside the seat back 14, the auxiliary inflation portion 85 adequately pushes the occupant P toward the inner side. The above movement enlarges the space between the side wall 11 and the occupant P in the vehicle width direction.

In contrast, the main inflation portion 51, which has projected forward from the seat back 14, continues being inflating thereafter. That is, the main inflation portion 51 is deployed and inflated outside the seat back 14, more specifically, in the space between the side wall 11 and the upper body of the occupant P.

At this time, as described above, the space between the side wall 11 and the occupant P is enlarged in the vehicle width direction as the auxiliary inflation portion 85 moves the occupant P. Thus, compared to a case in which the auxiliary inflation portion 85 does not enlarge the space in this manner, the main inflation portion 51 is easily deployed and inflated between the occupant P and the side wall 11, which is bulging into the passenger compartment.

The main inflation portion 51, which is deployed and inflated in the above described manner, restrains the occupant P. That is, the deployed and inflated main inflation portion 51 is located between the upper body of the occupant P and the side wall 11, which bulges into the passenger compartment. The main inflation portion 51 mitigates the impact from the side transmitted to the occupant P via the side wall 11, thereby protecting the occupant P from the impact.

Second Embodiment

Figure 14A:
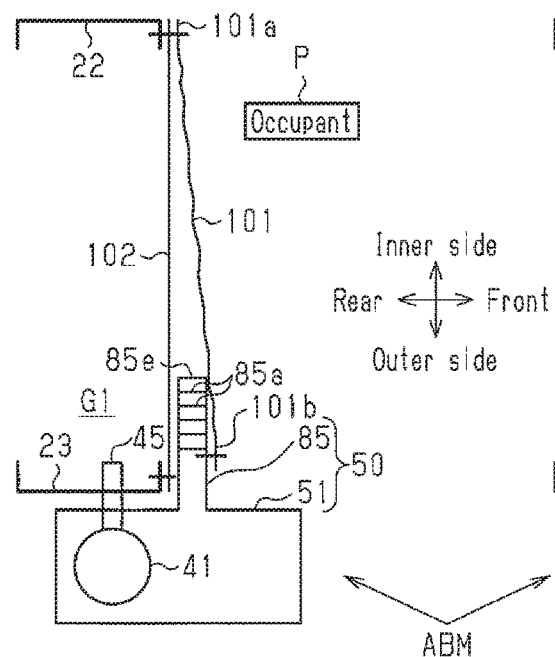
FIG. 14A is an explanatory diagram of a second embodiment, illustrating a state in which the airbag is stored in the vehicle seat.
Figure 14B:
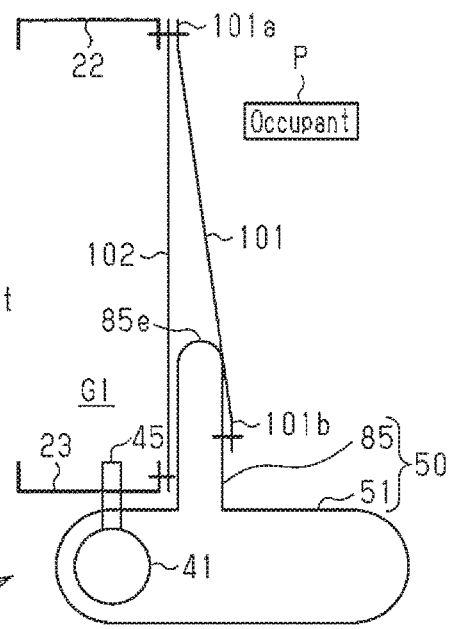
FIG. 14B is an explanatory diagram of the second embodiment, illustrating a state in which the airbag is inflated in the vehicle seat.

A vehicle seat with a side airbag apparatus according to a second embodiment will now be described with reference to FIGS. 14A, 14B.

In the second embodiment, the second end 101b of the tension belt 101 is fixed to a middle section (for example, the center) in the vehicle width direction of the auxiliary inflation portion 85 on the front side of the auxiliary inflation portion 85, that is, the fabric portion 88. Part of the auxiliary inflation portion 85 that is on the inner side of the part fixed to the tension belt 101 is folded to form superposed portions 85a, which are superposed on one another in the vehicle width direction. Part of the auxiliary inflation portion 85 that is on the outer side of the part fixed to the tension belt 101 is arranged to be spread in the vehicle width direction.

Other than these differences, the second embodiment is the same as the first embodiment. Thus, like or the same reference numerals are given to those components that are like or the same as the corresponding components described above in the first embodiment and detailed explanations are omitted.

The second embodiment thus achieves the same operations and advantages as the first embodiment. Since the superposed portions 85a are superposed on one another in the vehicle width direction, the measurement in the vehicle width direction of the auxiliary inflation portion 85 is smaller than that in the first embodiment. This facilitates the installation of the auxiliary inflation portion 85 at a predetermined position in the seat back 14.

When inflated, the auxiliary inflation portion 85 reduces its measurement in the vehicle width direction at the part that is on the outer side of the part fixed to the tension belt 101. The end of the auxiliary inflation portion 85 on the outer side is fixed to the second side frame portion 23 on the outer side. Thus, as the auxiliary inflation portion 85 is inflated, the part of the tension belt 101 fixed to the auxiliary inflation portion 85, that is, the second end 101b is moved toward the outer side. This pulls the tension belt 101 toward the outer side. When the auxiliary inflation portion 85 is completely inflated as shown in FIG. 14B, the tension belt 101 is tensioned. The tension belt 101 then restricts the movement of the auxiliary inflation portion 85, thereby preventing the auxiliary inflation portion 85 from being inflated rearward and entering the gap G1 of the seat frame 20.

Particularly in the second embodiment, the tension belt 101 is located between the occupant P and the auxiliary inflation portion 85. Thus, when the auxiliary inflation portion 85 pushes and moves the occupant P toward the inner side via the seat pad 30, the tension belt 101 is pushed by the occupant P, particularly, by the shoulder region PS, and warped rearward. When the auxiliary inflation portion 85 is completely inflated, the tension belt 101 is tensioned with a great tensile force. The tension belt 101 further restricts the movement of the auxiliary inflation portion 85, thereby properly preventing the auxiliary inflation portion 85 from being inflated rearward and entering the gap G1 of the seat frame 20.

Third Embodiment

Figure 15A:
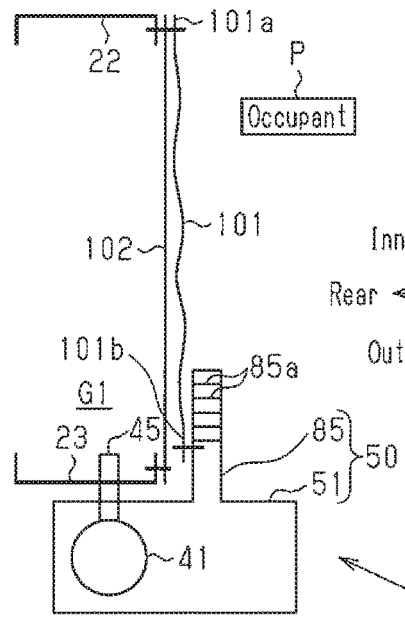
FIG. 15A is an explanatory diagram of a third embodiment, illustrating a state in which the airbag is stored in the vehicle seat.
Figure 15B:
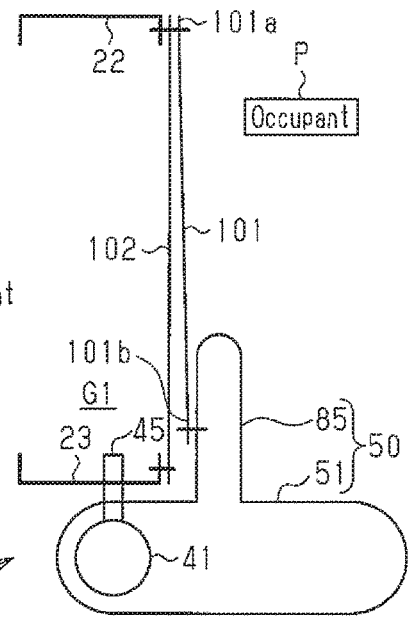
FIG. 15B is an explanatory diagram of the third embodiment, illustrating a state in which the airbag is inflated in the vehicle seat.

A vehicle seat with a side airbag apparatus according to a third embodiment will now be described with reference to FIGS. 15A, 15B.

In the third embodiment, the second end 101b of the tension belt 101 is fixed to a middle section (for example, the center) in the vehicle width direction of the auxiliary inflation portion 85 on the rear side of the auxiliary inflation portion 85, that is, the fabric portion 87. Part of the auxiliary inflation portion 85 that is on the inner side of the part fixed to the tension belt 101 is folded to form superposed portions 85a, which are superposed on one another in the vehicle width direction. Part of the auxiliary inflation portion 85 that is on the outer side of the part fixed to the tension belt 101 is arranged to be spread in the vehicle width direction.

The third embodiment thus achieves the same operations and advantages as the second embodiment. The third embodiment is different in operations and advantages from the second embodiment in that the second end 101b of the tension belt 101 is fixed to the rear surface of the auxiliary inflation portion 85.

That is, in the third embodiment, the tension belt 101 is located rearward of the auxiliary inflation portion 85. Thus, when the auxiliary inflation portion 85 pushes and moves the occupant P toward the inner side via the seat pad 30, the auxiliary inflation portion 85 is pushed rearward by the occupant P. The pressing force is applied to the tension belt 101, so that the tension belt 101 is tensioned with a great tensile force. The tension belt 101 further restricts the movement of the auxiliary inflation portion 85, thereby properly preventing the auxiliary inflation portion 85 from being inflated rearward and entering the gap G1 of the seat frame 20.

Fourth Embodiment

Figure 16:
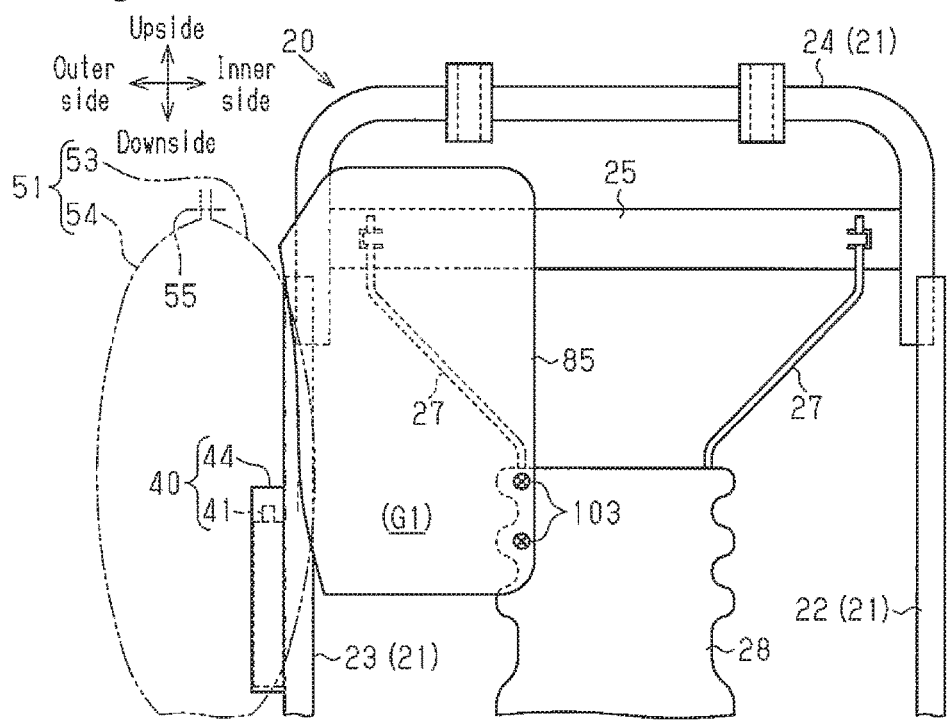
FIG. 16 is a partial front view as viewed from the front side of the vehicle, illustrating a seat frame of a vehicle seat according to a fourth embodiment.

A vehicle seat with a side airbag apparatus according to a fourth embodiment will now be described with reference to FIG. 16.

In the fourth embodiment, the auxiliary inflation portion 85 is spread in the vehicle width direction and arranged forward of the pressure receiving plate 28 of the seat back 14. The part of the auxiliary inflation portion 85 on the outer side is fixed to the second side frame portion 23 on the outer side. The inner side of the auxiliary inflation portion 85 is superposed on the front side of the pressure receiving plate 28. The part of the auxiliary inflation portion 85 that is superposed on the pressure receiving plate 28 is directly fixed to the pressure receiving plate 28 with fixing members 103 such as clips. The fixing members 103 constitute an entry preventing portion. In the fourth embodiment, the rear belt 102 is not used. However, the rear belt 102 may be used.

Other than these differences, the fourth embodiment is the same as the first embodiment. Thus, like or the same reference numerals are given to those components that are like or the same as the corresponding components described above in the first embodiment and detailed explanations are omitted.

The fourth embodiment thus achieves the same operations and advantages as the first embodiment. The fourth embodiment is different in operations and advantages from the first embodiment in that the auxiliary inflation portion 85 is fixed to the pressure receiving plate 28, instead of the first side frame portion 22 on the inner side.

That is, in the fourth embodiment, the auxiliary inflation portion 85 in a spread state in the vehicle width direction is fixed, at the part on the outer side, to the second side frame portion 23 on the outer side. The auxiliary inflation portion 85 is also fixed, at the part on the inner side, to the pressure receiving plate 28 with the fixing members 103. In this manner, the auxiliary inflation portion 85 in a spread state is restricted from moving by being fixed at the two positions in the vehicle width direction. This restricts the auxiliary inflation portion 85 from being inflated rearward and entering the gap G1 of the seat frame 20.

Fifth Embodiment

Figure 17:
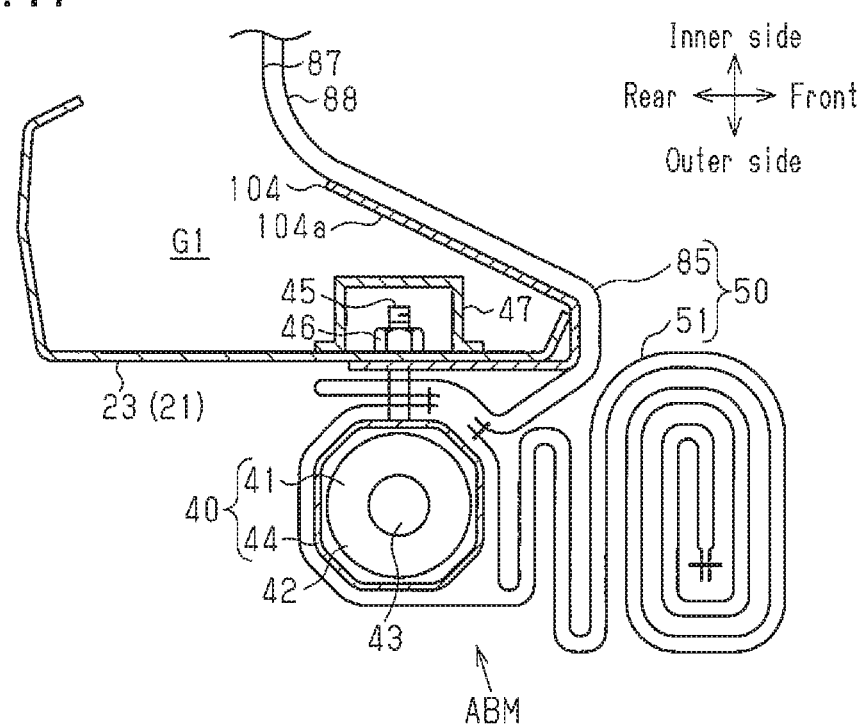
FIG. 17 is a partial cross-sectional plan view illustrating a second side frame portion and the surrounding structure on the outer side according to a fifth embodiment.

A vehicle seat with a side airbag apparatus according to a fifth embodiment will now be described with reference to FIG. 17.

In the fifth embodiment, the auxiliary inflation portion 85 is fixed to the second side frame portion 23 on the outer side. Unlike the first to fourth embodiments, a guide member 104 is used as an entry preventing portion in the fifth embodiment. The guide member 104 guides inflation of part of the auxiliary inflation portion 85 that is on the inner side of the part fixed to the second side frame portion 23. Specifically, the guide member 104 guides the part to be inflated from the second side frame portion 23 toward the inner side and diagonally forward. The guide member 104 is formed by bending a metal plate or the like and is fixed to the second side frame portion 23. The bolts 45 and the nuts 46, which are configured to fix the main inflation portion 51, the inner tube 70, and the auxiliary inflation portion 85 to the second side frame portion 23, are used to fix the guide member 104 to the second side frame portion 23. In FIG. 17, the inner tube 70 is not illustrated. The guide member 104 includes an inclined portion 104a, which is located on the inner side of the second side frame portion 23. The inclined portion 104a is inclined relative to the front-rear direction such that the closer to the inner side, the closer to the rear end of the vehicle seat 12.

As the guide member 104, a plate-shaped member made of a hard material such as plastic may be employed. The guide member 104 may be fixed to the second side frame portion 23 using fasteners other than the bolts 45 and the nuts 46. Further, the guide member 104 may be integrally formed with the second side frame portion 23.

Other than these differences, the fifth embodiment is the same as the first embodiment. Thus, like or the same reference numerals are given to those components that are like or the same as the corresponding components described above in the first embodiment and detailed explanations are omitted.

The fifth embodiment thus achieves the same operations and advantages as the first embodiment. The fifth embodiment is different in operations and advantages from the first embodiment in that the guide member 104 is used.

That is, in the fifth embodiment, when inflated with inflation gas supplied from the inflator 41, the auxiliary inflation portion 85 is guided by the inclined portion 104a of the guide member 104 to be inflated from the second side frame portion 23 on the outer side toward the inner side and diagonally forward. This guiding action restricts the auxiliary inflation portion 85 from being inflated rearward and entering the gap G1 of the seat frame 20.

Also, since the pressure of the inflation gas in the auxiliary inflation portion 85 is received by the inclined portion 104a, reaction force acting toward the inner side and diagonally forward is efficiently generated. The reaction force efficiently pushes part of the seat back 14 that is forward of the auxiliary inflation portion 85, so that the part bulges toward the inner side and diagonally forward to push the back of the occupant P leaning against the seat back 14, and the occupant P is then moved toward the inner side.

The above-described embodiments may be modified as follows.

In the first to third embodiments, the rear belt 102 may be omitted, and the entry preventing portion may be constituted solely by the tension belt 101. In this case, two or more tension belts 101 may be arranged in the vertical direction.

Likewise, in the first to third embodiments, the tension belt 101 may be omitted, and the entry preventing portion may be constituted solely by the rear belt 102. In this case, two or more rear belts 102 may be arranged in the vertical direction.

Contrary to the first to third embodiments, the rear belt 102 may be located above the tension belt 101.

In the case in which the tension belt 101 and the rear belt 102 are both employed as in the first to third embodiments, two or more tension belts 101 may be arranged in the vertical direction, or two or more rear belts 102 may be arranged in the vertical direction. Alternatively, two or more tension belts 101 and two or more rear belts 102 both may be arranged in the vertical direction.

If two or more tension belts 101 are employed in the second embodiment, the tension belts 101 are preferably arranged at a height corresponding to that of the shoulder region PS of the occupant P. With this configuration, when the auxiliary inflation portion 85 pushes and moves the occupant P toward the inner side via the seat pad 30, the tension belts 101, which are at the height corresponding to the shoulder region PS, are pushed and warped by the shoulder region PS of the occupant P as described above. When the auxiliary inflation portion 85 is completely inflated, the tension belts 101 are tensioned with great tensile force.

In place of the rear belt 102, a spring may be provided, in a tensioned state, to bridge the first and second side frame portions 22, 23.

Also, in place of the rear belt 102, a plate member may be provided to bridge the first and second side frame portions 22, 23.

The above described airbag 50, which is installed in the seat back 14, may be replaced by the one disclosed in Japanese Laid-Open Patent Publication No. 2009-23490 or the one disclosed in Japanese Laid-Open Patent Publication No. 2009-23494.

At least one of the partition 60 and the inner tube 70 of the side airbag apparatus may be omitted.

Vehicles to which any of the above described vehicle seats with a side airbag apparatus is applied include various industrial vehicles in addition to private cars.

The invention claimed is:

1. A vehicle seat with a side airbag apparatus, comprising:
a seat frame, which forms a framework of a seat back and includes
a pressure receiving plate arranged at a center in a vehicle width direction, and
an outer frame portion, which is separated from and surrounds the pressure receiving plate,
the side airbag apparatus, which includes an airbag and an inflator, wherein the airbag and the inflator are installed in an outer side section of the seat back, and the airbag includes
a main inflation portion, which is configured to be inflated with inflation gas supplied from the inflator and project from the seat back to be deployed forward between a side wall of the vehicle and an occupant leaning against the seat back in a normal posture, and
an auxiliary inflation portion, which is configured to, prior to deployment of the main inflation portion outside the seat back, be inflated on a front side of the pressure receiving plate in the seat back with inflation gas from the inflator, thereby pushing the occupant toward an inner side, and
an entry preventing portion, which prevents the auxiliary inflation portion being inflated from entering a gap between the outer frame portion and the pressure receiving plate.

2. The vehicle seat with a side airbag apparatus according to claim 1, wherein
the outer frame portion includes a pair of side frame portions which forms opposite side sections in the vehicle width direction of the outer frame portion,
the side frame portions include
a first side frame portion, which constitutes an inner side section of the outer frame portion, and
a second side frame portion, which constitutes an outer side section of the outer frame portion,
the auxiliary inflation portion is fixed to the second side frame portion,
the entry preventing portion includes a tension belt, which extends in the vehicle width direction and includes
a first end, which is fixed to the first side frame portion, and
a second end, which is fixed to part of the auxiliary inflation portion that is on the inner side of the part fixed to the second side frame portion, and
the tension belt is tensioned when the auxiliary inflation portion is completely inflated.

3. The vehicle seat with a side airbag apparatus according to claim 2, wherein
part of the auxiliary inflation portion that is on the inner side of the part fixed to the second side frame is arranged to be spread in the vehicle width direction, and
the second end of the tension belt is fixed to an end on the inner side of the auxiliary inflation portion in the spread state.

4. The vehicle seat with a side airbag apparatus according to claim 2, wherein
the second end of the tension belt is fixed to a middle part in the vehicle width direction of the auxiliary inflation portion,
part of the auxiliary inflation portion that is on the inner side of the part fixed to the tension belt is configured by a plurality of superposed portions, which are superposed on one another in the vehicle width direction, and part of the auxiliary inflation portion that is on the outer side of the part fixed to the tension belt is arranged to be spread in the vehicle width direction.

5. The vehicle seat with a side airbag apparatus according to claim 1, wherein
the outer frame portion includes a pair of side frame portions which forms opposite side sections in the vehicle width direction of the outer frame portion,
the side frame portions include
a first side frame portion, which constitutes an inner side section of the outer frame portion, and
a second side frame portion, which constitutes an outer side section of the outer frame portion,
the auxiliary inflation portion is arranged to be spread in the vehicle width direction,
part of the auxiliary inflation portion on the outer side is fixed to the second side frame portion, and
the entry preventing portion includes a fixing member, which fixes part of the auxiliary inflation portion on the inner side to the pressure receiving plate.

6. The vehicle seat with a side airbag apparatus according to claim 1, wherein
the outer frame portion includes a pair of side frame portions which forms opposite side sections in the vehicle width direction of the outer frame portion,
the side frame portions include
a first side frame portion, which constitutes an inner side section of the outer frame portion, and
a second side frame portion, which constitutes an outer side section of the outer frame portion,
the auxiliary inflation portion is fixed to the second side frame portion, and
the entry preventing portion includes a guide member, which guides part of the auxiliary inflation portion that is on the inner side of the part fixed to the second side frame portion to be inflated from the second side frame portion toward the inner side and diagonally forward.

7. The vehicle seat with a side airbag apparatus according to claim 6, wherein the guide member includes an inclined portion, which is located on the inner side of the second side frame portion and is inclined relative to a front-rear direction such that the closer to the inner side, the closer to a rear end of the vehicle seat.

8. The vehicle seat with a side airbag apparatus according to claim 1, wherein
the outer frame portion includes a pair of side frame portions which forms opposite side sections in the vehicle width direction of the outer frame portion,
the side frame portions include
a first side frame portion, which constitutes an inner side section of the outer frame portion, and
a second side frame portion, which constitutes an outer side section of the outer frame portion,
the auxiliary inflation portion is fixed to the second side frame portion, and
the entry preventing portion includes a rear belt, which bridges, in a tensioned state, the first and second side frame portions such that part of the rear belt is located behind the auxiliary inflation portion in a spread state.

9. The vehicle seat with a side airbag apparatus according to claim 1, wherein the auxiliary inflation portion is configured to be completely inflated at an earlier time than the main inflation portion.

* * * * *